Dec. 26, 1967 SHINICHIRO OGAWA 3,360,661
AUTOMATIC AND MANUAL SWITCHING SYSTEM
IN AN ELECTRONIC CONTROLLER
Filed Nov. 13, 1964 2 Sheets-Sheet 1

INVENTOR.
SHINICHIRO OGAWA
BY Arthur H. Swanson

United States Patent Office 3,360,661
Patented Dec. 26, 1967

3,360,661
AUTOMATIC AND MANUAL SWITCHING SYSTEM IN AN ELECTRONIC CONTROLLER
Shinichiro Ogawa, Chuo-ku, Tokyo, Japan, assignor to Honeywell Inc., Minneapolis, Minn., a corporation of Delaware
Filed Nov. 13, 1964, Ser. No. 410,920
Claims priority, application Japan, Nov. 14, 1963, 38/60,898
5 Claims. (Cl. 307—70)

ABSTRACT OF THE DISCLOSURE

There is disclosed a signal matching means for industrial process control systems to enable a "bumpless" transfer between automatic and manual control of a current responsive instrumentality wherein separate current sources provide the automatic and manual control, respectively. The technique involves the application of the current signals from both sources to a single sensing resistor, but in opposite polarity with respect to each other. Means are provided for detecting a null when the two signals match, enabling the "bumpless" transfer.

This invention relates to a switching system for switching between automatic and manual control operations in an electronic controller and more particularly to a switching system which acts with simplicity and with stability in comparison with conventional switching systems.

Heretofore, there has been provided an industrial process controller which makes the output of a controller unit follow the output of a manual control unit, in case of manual control operation, and which is able to accomplish an operation of switching from manual control to automatic control in one operation. As used herein, the term "industrial process controller" refers to an electronic control apparatus which responds to a comparison of a signal derived from a process variable, such as temperature, pressure, or the like, with a predetermined signal representative of a desired control point of the controlled process. The resulting "error" signal is applied as input signal to the controller which, in turn, produces an output control signal. The control signal, when applied to the controlled instrumentality of the process, tends to reduce the error signal to zero. The "manual controller" refers to a signal source which may be manually adjusted and applied directly to the controlled instrumentality of the process in lieu of the "automatic" signal. To obtain such a controller as mentioned above, various kinds of switching circuit systems have been provided. However, those switching circuit systems are of a complicated construction.

It is an object of this invention to provide an improved controller switching system which is simple in construction and stable in operation in comparison with conventional controller switching systems.

It is another object of this invention to provide an electrical "protection switch" circuit which is simple in construction which enables the automatic controller or the manual control unit to be readily removed from the system without appreciably disturbing the controlled process.

The nature of the invention will be better understood from the following description of embodiments thereof taken in conjunction with the accompanying drawing in which.

Figure 1:
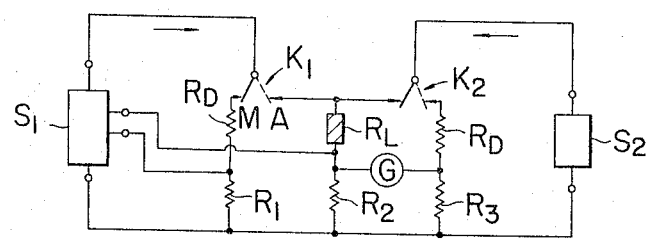
FIG. 1 is a simple circuit of an automatic and manual switching system in accordance with prior art.

Referring to FIG. 1, which shows a fundamental circuit of the conventional system, signal sources $S_1$ and $S_2$ are constant current sources, $S_1$ being an automatic controller, as mentioned above, and $S_2$ being a manual control unit. The circuit shown in FIG. 1 is illustrated as operating in the "manual" mode. Thus current from the signal source $S_2$ flows in the circuit comprising the signal source $S_2$, a contact M of a switch $K_2$, a load $R_L$, and a resistor $R_2$, thereby some amount of voltage drop will be obtained across the resistor $R_2$. On the other hand, current from the signal source $S_1$ flows in the circuit comprising the signal source $S_1$, a contact M of a switch $K_1$, a dummy load resistor $R_D$ and a resistor $R_1$, thereby some amount of voltage drop will be obtained across the resistor $R_1$. Supposing $R_1=R_2$, when the potential difference between the voltage drops across the resistor $R_1$ and the resistor $R_2$, respectively, is fed-back negatively to the signal source $S_1$, the signal source $S_1$ will be controlled by that feedback signal or potential difference in a direction to reduce the potential difference to zero. Thus, if the signal source $S_1$ includes an amplifier having a high gain or amplification factor, the source will be controlled by and made to follow the signal from the signal source $S_2$. Under these conditions, the switches $K_1$ and $K_2$ may be switched to the "A" position without producing a sudden change or "bump" in the current flowing through the load $R_L$.

By exchanging the switch $K_1$ and the switch $K_2$ which may be ganged for synchronous operation into the dotlined or "A" positions shown in FIG. 1, the output current of the signal source $S_2$ could be also controlled by the output current of the signal $S_1$. However, generally the signal source $S_2$ is controlled by manual operation. Therefore, the output of the signal source $S_2$ may be made equal to the output of the signal source $S_1$ by using a galvanometer G shown in FIG. 1 to detect and indicate the null. In this case, the resistance of the resistor $R_2$ is equal to the resistance of the resistor $R_3$.

It is noted that, in accordance with this prior art switching device, the resistors $R_1$, $R_2$ and $R_3$ should be accurate type resistors and these resistors should be substantially equal in value. It is also noted that, generally, the dummy load resistor $R_D$ should be available which is connected, selectively, in series with the resistor $R_1$ and the resistor $R_3$, and that the exchange operation of the switch $K_1$ and the switch $K_2$ should be synchronized.

Figure 2:
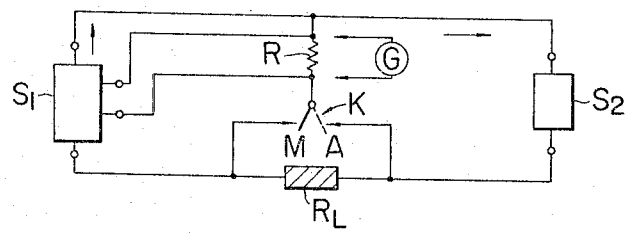
FIG. 2 is a simple circuit of the automatic and manual switching system in accordance with this invention.

Referring to FIG. 2, there is shown an embodiment of the present invention. As in the prior art structure shown in FIG. 1, there is shown a constant current signal source $S_1$, which is an industrial process controller, as before. Also, there is provided a constant current signal source $S_2$, which is a manual controller, also as before. A first output terminal of the source $S_1$ is connected to a common junction, thence through a comparison resistor R, to the movable contact member, or common terminal, of a double-throw switch K. One of the fixed contacts M, or first selectable terminal, of the switch K is connected to the other output terminal of the source $S_1$. A first output terminal of the source $S_2$ is also connected to the common junction, thence through the comparison resistor R to the movable contact member, or common terminal, of the switch K. The other fixed contacts A, or second selectable terminal, of the switch K is connected to the other output terminal of the source $S_2$. A load $R_L$ is connected between the two fixed contacts M and A of the switch K. A galvanometer G is selectably connected across the ends of the comparison resistor R. Connection means is also provided for applying the signal developed across the resistor R, in feedback relation, to the input terminals of the source $S_1$, or automatic controller.

With the switch K in the position shown by the solid line in FIG. 2, the current from the signal source $S_1$ flows in one direction as indicated by the associated arrows through the comparison resistor R and the contact M of the switch K; while the current from the signal source $S_2$ flows through the load $R_L$, the contact M of the switch K and in an opposite direction through the comparison resistor R. There is thus provided a differential, or resultant, current between the currents from the signal source $S_1$ and the signal source $S_2$ across the resistor R. There is thereby provided across the resistor R, a potential difference which is representative of the difference in the currents from the signal source $S_1$ and the signal source $S_2$. When this potential difference is fed-back negatively to the signal source $S_1$, as was noted in connection with the circuit of FIG. 1, the current from the signal $S_1$ can be controlled by or made to follow the current from the signal source $S_2$.

When the switch K is switched to the dot-lined position, the output from the signal source $S_2$ can be also, as mentioned above, controlled by or made to follow the output from the signal source $S_1$ if the source $S_2$ is also an automatic controller. However, the usual arrangement is that the source $S_2$ is a manually controlled signal source. In order to ascertain that the signal generated by the manual controller is equal to that produced by the automatic controller, the galvanometer G is connected across the terminals of the comparison resistor R. When the currents through the resistor R sum to zero, the signals are equal. When the signals are equal, the control of the system may be switched from automatic control to manual control without a "bump" to the system.

It should be noted that the only requirement for the resistor R is that it be large enough to detect the current therethrough; other than that, any resistor is suitable for this element of the invention and it does not matter that there may be variations in the value of the resistor. Thus, according to this invention, there is provided a switching circuit for switching between automatic and manual control which is simple in construction and uses only one change-over switch. It is apparent from the explanation above that the circuit in accordance with this invention, is not limited by the availability of matched parts in the circuit, operates stably, and therefore is constructed in a manner providing a lower manufacturing cost than that of the conventional circuit.

Figure 3:
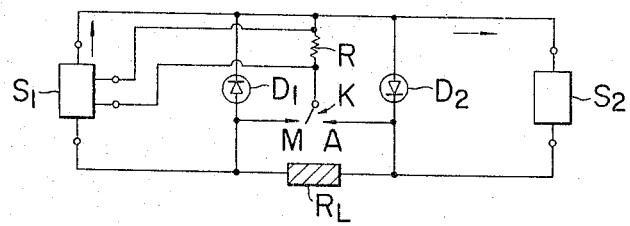
FIG. 3, FIG. 4 and FIG. 5 are other embodiments of the circuit of the automatic and manual switching system in accordance with this invention and featuring the protection means.

A circuit protection system, in accordance with this invention, which is used in removing the automatic controller or the manual controller will be explained as follows. FIG. 3 shows the principal features of the circuit protection system provided in accordance with this invention. Referring to FIG. 3, there is shown a circuit similar to that of FIG. 2 but which is provided with non-linear or unidirectional conducting elements (for an example a silicon-diode) $D_1$ and $D_2$ across the signal-source side terminals of the comparison resistor R and the fixed contacts of the switch K, respectively, by-passing the comparison resistor R and the switch K.

Figure 4:
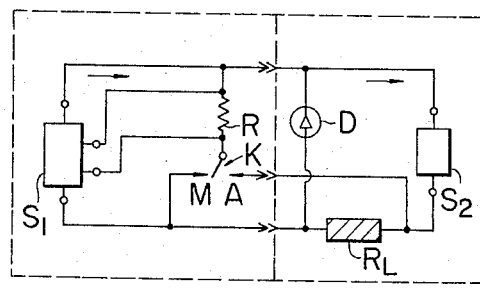

Referring to FIG. 2, in case that a part of the circuit comprising the switch K and the comparison resistor R is included in either the automatic control unit or the manual control unit, and if either of the automatic control unit and the manual control unit is physically removed from the circuit, the circuit having the load $R_L$ will be open. The circuit of FIG. 3 is a generalized showing of means for protecting the process in the event that a fault occurs which effectively removes one of the controllers and the transfer switch K from the circuit. If, for example, the process is under manual control and, for some reason, the manual controller $S_2$ and the switch K were to be removed from the circuit, current would flow from the automatic controller $S_1$, through the diode $D_2$ and the load $R_L$ back to the controller $S_1$. Conversely, if the automatic controller $S_1$ and the switch K were to be effectively removed from the system, current would flow from the manual controller $S_2$ through the load $R_L$ and the diode $D_1$, back to the controller $S_2$. A particular embodiment of this circuit protection system is shown in FIG. 4, which is a circuit suitable for use in removing the automatic control unit $S_1$ and in which the switch K and the comparison resistor R are included in the removable package with the controller $S_1$. When the control unit $S_1$ is removed from the circuit shown in FIG. 4, whether the system is in manual operation or automatic operation, the out-put current from the signal source $S_2$ under manual operation will flow-through the non-linear element D without cutting-off the operation of the system.

Figure 5:
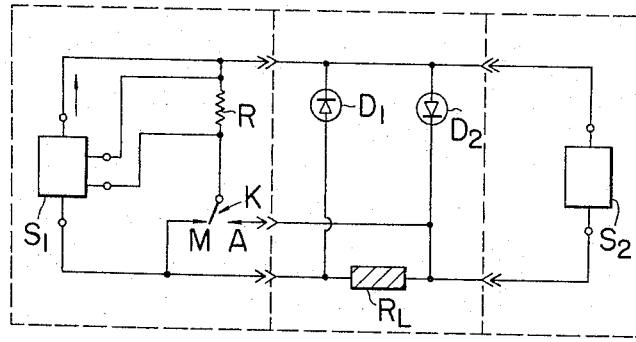

Another embodiment of the system protection scheme is shown in FIG. 5. In that embodiment, the circuit is similar to that shown in the generalized showing of FIG. 3 but arranged with the switch K and the comparison resistor R included in a removable module with the automatic controller $S_1$. Also, the manual controller $S_2$ is shown as a separate removable module. As before, when either of these controller modules is removed, energy is supplied to the load $R_L$ from the remaining controller through the corresponding associated diode.

In each of the structures shown in FIGS. 3–5, the "bumpless" transfer feature between manual and automatic control, as set forth in FIG. 2, is provided and features a substantial improvement over conventional protection switching circuit, which conventional circuits involve complicated and expensive mechanical or magnetic switching means.

What is claimed is:

1. In an industrial process control system for controlling the energization of a load device, said control system including an automatic control unit and a manual control unit, an improved switching system for selectively connecting one or the other of said control units in series with the load device; said switching system comprising a switch means having a first selectable terminal, a second selectable terminal and a common terminal; means for connecting said load device between the two selectable terminals of said switch means; means connecting a first output terminal of said automatic control unit to said first selectable terminal of said switch means; means connecting a second output terminal of said automatic controller to a common junction; means connecting a first output terminal of said manual control unit to said second selectable terminal of said switch means; means connecting a second output terminal of said manual control unit to said common junction; a comparison resistor; means connecting said comparison resistor in series between said common junction and said common terminal of said switch means; said automatic and manual control units being connected to apply signals of opposite polarity across said comparison resistor; and means for detecting a resultant signal developed across said comparison resistor.

2. The invention as set forth in claim 1 wherein said last mentioned means includes a feedback connection to a pair of input terminals of said automatic control unit whereby to cause said automatic control unit to follow the energization of said load device when said system is connected for manual control.

3. The invention as set forth in claim 1 wherein said last mentioned means includes a signal indicator whereby said manual control unit may be adjusted to match the energization of said load device when said system is connected for automatic control.

4. The invention as set forth in claim 1 and characterized by the addition of a first unidirectional conducting device connected between said first selectable terminal of said switch means and said common junction and polarized to conduct current signals from said manual control unit through said load device.

5. The invention as set forth in claim 4 and characterized by the addition of a second unidirectional conducting device connected between said second selectable terminal of said switch means and said common junction and polarized to conduct current signals from said automatic control unit through said load device.

References Cited

UNITED STATES PATENTS

| | | | |
|---|---|---|---|
| 2,679,022 | 5/1954 | McIlhenny | 307—43 X |
| 2,762,938 | 9/1956 | Newbold | 307—116 |
| 2,764,701 | 9/1956 | Miller | 307—116 |
| 2,956,234 | 10/1960 | Olsen | 330—10 |
| 3,081,425 | 3/1963 | Newbold | 323—22 |

ORIS L. RADER, *Primary Examiner.*

W. DUNCANSON, *Assistant Examiner.*